Aug. 2, 1966   G. W. SCHEFFLER ET AL   3,263,301
MACHINE FOR IRONING INSULATING MATERIAL AROUND
THE STRAIGHT ARMS OF COILS OF ELECTRIC
MACHINES AND APPARATUSES

Filed Dec. 10, 1963   3 Sheets-Sheet 1

INVENTORS:
GERHARD SCHEFFLER
KARL BRAND
BY E. M. Squire
THEIR ATT'Y.

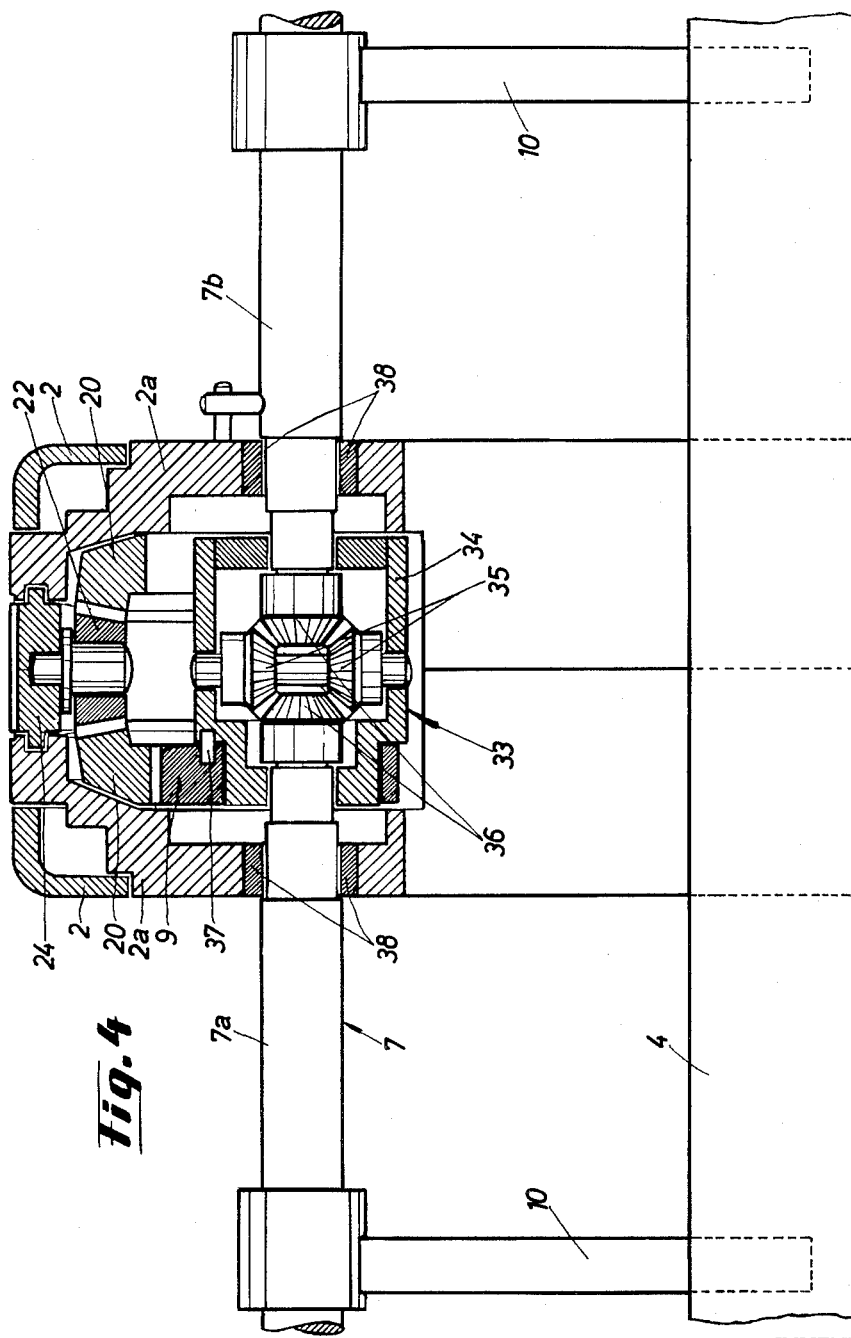

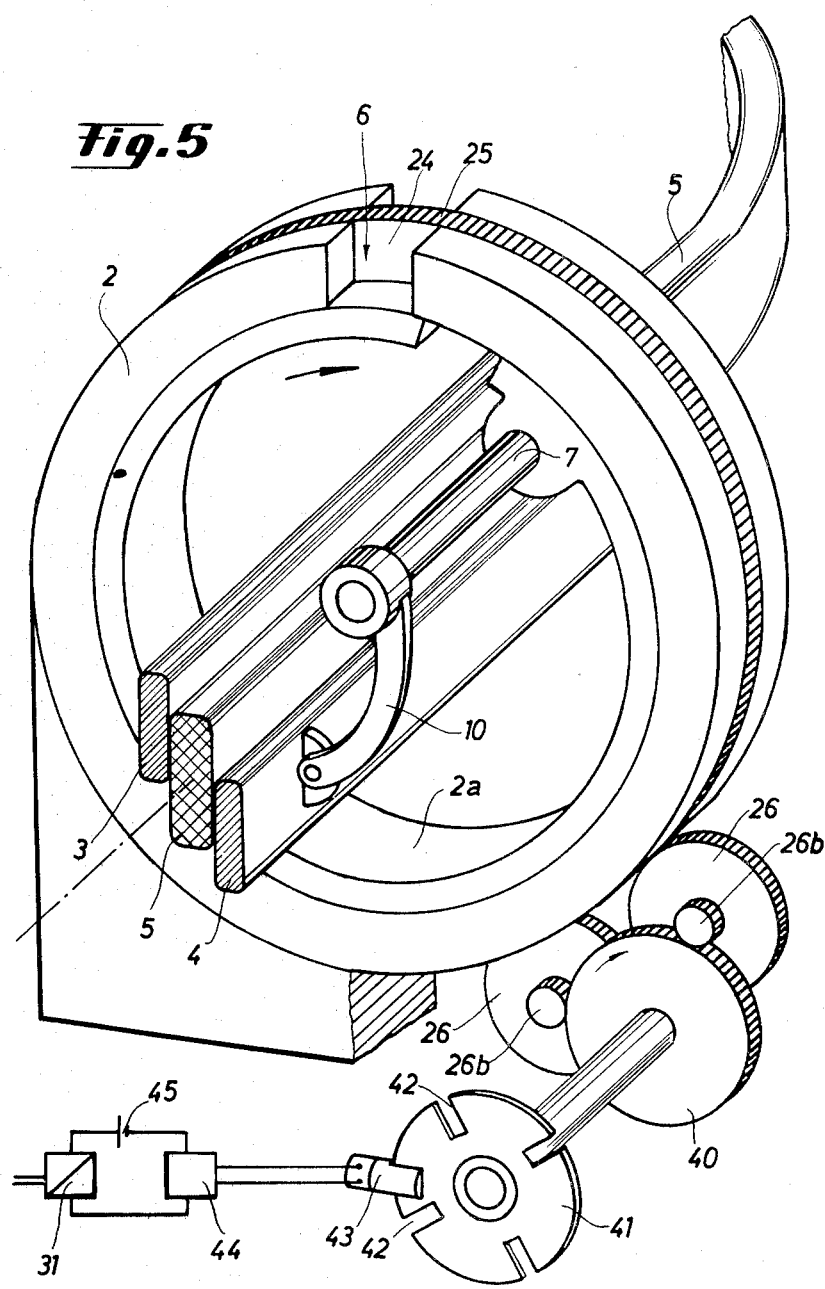

United States Patent Office 3,263,301
Patented August 2, 1966

3,263,301
MACHINE FOR IRONING INSULATING MATERIAL AROUND THE STRAIGHT ARMS OF COILS OF ELECTRIC MACHINES AND APPARATUSES
Gerhard W. Scheffler and Karl A. J. Brand, Lubeck, Germany, assignors to Heinrich Schümann, Lubeck, Germany
Filed Dec. 10, 1963, Ser. No. 329,412
Claims priority, application Germany, Dec. 15, 1962, Sch 32,479
15 Claims. (Cl. 29—90)

The present invention relates to a machine for applying heated pressing irons to insulating material which extends along the straight portion of a winding or coil to be included in electrical machinery such as motors, generators or other apparatus.

The machine comprises annular members each having a radial slot which may be aligned with the slots of the other members to permit the insertion or removal of the coil to be ironed. The straight portion of the coil to be ironed is fixedly positioned at the common axis of the annular members by suitable chucks and opposed cooperating ironing members simultaneously apply oppositely directed pressures to the insulation at opposite sides of the straight portion of the coil.

One of the annular members is positively driven and another member is braked. Pivoted levers carried by one of the members apply an ironing pressure the magnitude of which is determined by the braking force. The levers are provided with sector gears which cooperate with differential gearing, whereby a common equalized ironing pressure is applied simultaneously to both ironing members notwithstanding the fact that the coil may be somewhat eccentrically positioned or may have major surface irregularities. The amount of ironing pressure may be substantially instantaneously adjusted by control of the braking action as the ironing members progress around the lateral surface of the coil insulation.

The positive action of the braking mechanism and differential gearing avoids the need for any resilient connections to the ironing members and a positively controlled ironing pressure is obtained at all times.

The invention is described in greater detail in the following specification with reference to the accompanying drawings forming a part hereof.

Referring to the drawing:

FIGURE 4 is a fragmentary plan sectional view of a modification wherein additional differential gearing is provided to compensate for axial misalignment of the coil in addition to eccentricity.

FIGURE 5 is a schematic perspective view additionally illustrating cam actuated means for controlling the braking action.

Figure 1:
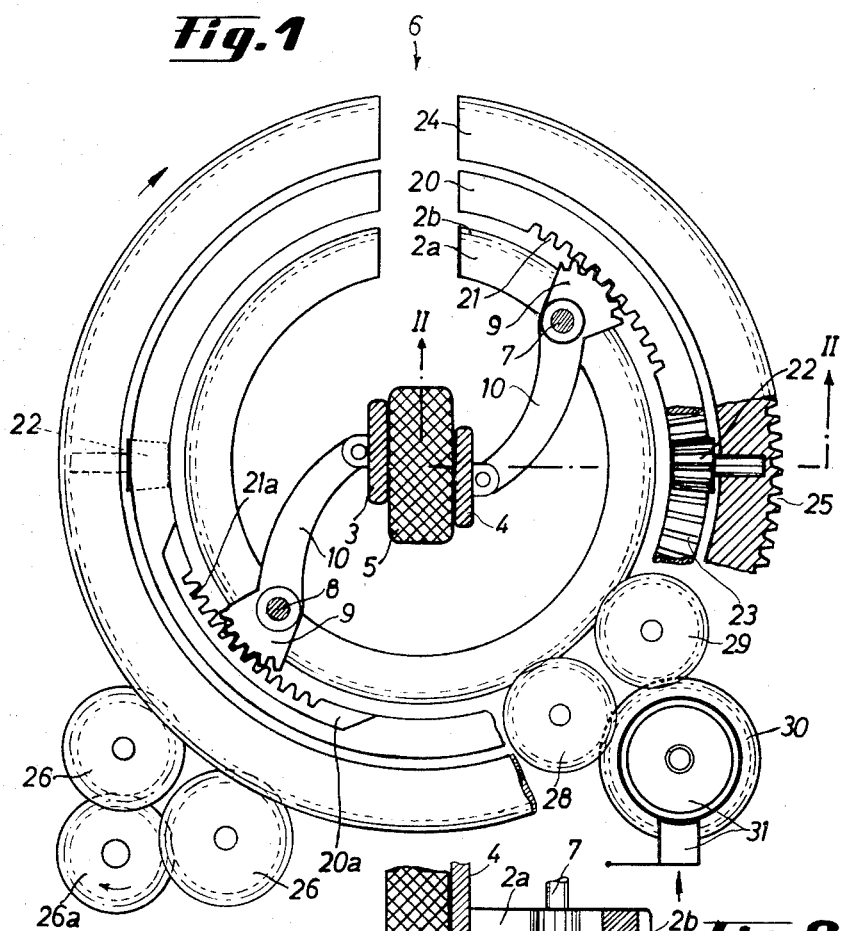
FIGURE 1 is a schematic side elevational view of a machine embodying the invention, the view being partly broken away and shown in section to illustrate details of construction.

The machine comprises a housing 2 in which a support ring 2a is journalled. This support ring is provided with a transverse slot 6 serving to pass the coil arm 5 therethrough. Double armed levers 10 are pivotally supported on this support ring 2a by diametrically oppositely located pivot shafts 7 and 8. The heated pressing members or ironing jaws 3 and 4 are pivotally mounted on the inner free ends of the lever arms 10. The outer ends of the lever arms 10 are formed as sector gears 9. Each of the sector gears 9 meshes with teeth 21 or 21a formed on two individual drive members 20 and 20a, respectively, which are suitably journalled slotted rings concentrically arranged with respect to the support ring 2a. Both drive member, or rings 20, 20a respectively, are coupled by differential gears 22 which mesh with bevel gear teeth 23 formed on confronting sides of the rings 20 and 20a. The bevel gear teeth 23 need extend only over a portion of the circumference of each ring 20 or 20a since the relative movement of the rings with respect to each other is very small. The differential gears 22 are journalled in a central drive ring 24 which is also transversely slotted at 6 and comprises outer teeth 25 meshing with the intermediate drive gears 26 (FIG. 5). The intermediate drive gears 26 are arranged in one plane adjacent to each other so as to drivingly bridge the slot in the drive ring 24 and are in continuous meshing engagement with a common drive gear 26a connected to the drive motor (not shown).

Figure 3:
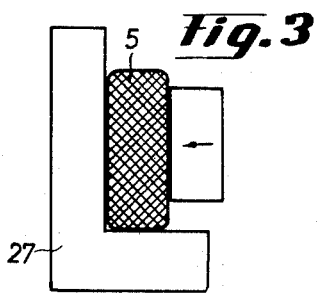
FIGURE 3 is a side elevational view of a stationary chuck for holding the coil, the coil being shown in transverse section.
Figure 2:
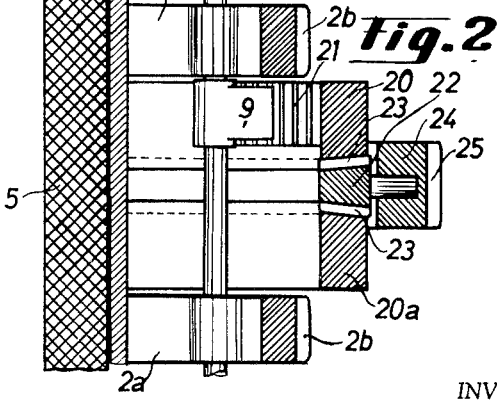
FIGURE 2 is a sectional view taken along the line II—II of FIG. 1.

When the ironing jaws 3 and 4 are rotating around the chucked coil arm 5, possible eccentricities of the arm 5, or of the chuck (FIG. 3) may be compensated for without the need for springs between the sector gears 9 and the ironing jaws 3, 4. In addition it is also possible to chuck the coil arm 5 eccentrically intentionally, whereby it is possible to use precisely positioned stationary nonadjustable abutment angles 27 (FIG. 3), thereby assuring that the axis of the coil arm 5 is always disposed exactly in parallel relation to the axis of rotation of the machine, since the imaginary connecting line of these nonadjustable abutments may be aligned exactly in parallel relation to the axis of rotation. By means of this alignment, a substantially uniformly distributed ironing pressure is obtained along the entire portion of the length of the coil 5 which engages the ironing jaws.

In the modification of FIG. 4, the supporting shafts, which carry the ironing jaws by means of lever arms, are divided into two axially aligned separate portions which extend from opposite sides of the support ring, and each sector gear engaging a drive ring 20 or 24 is drivingly connected by differential gearing with each of the aligned separate shafts 7a, 7b. Corresponding shafts 8a, 8b have been omitted from the drawing. In FIG. 4 the support ring is designated 2a, the housing of the machine 2, the drive ring 24, and the single ironing jaw which is illustrated is designated 4. The other ironing jaw 3 and coil 5 are not shown. The supporting shaft 7 of FIG. 1 for the lever arms 10 of the double armed levers carrying the ironing jaw 4 is in this case separated into two separate axially aligned shafts 7a and 7b. These two half shafts are connected with the sector gear 9, which engages the drive ring 24, or the ring 20a respectively by individual differential gearing. The gear segment 9 for each of ironing jaws 3 and 4 forms the other arm of the above mentioned double arm lever.

The differential gearing is formed by a bevel gear transmission comprising a gear case 34 concentrically arranged at the adjacent ends of the aligned shafts 7a, 7b. Within the gear case 34 two differential gears 35 are supported to rotate about an axis disposed normally with respect to the common axis of the shafts 7a and 7b. The adjacent ends of shafts 7a and 7b carry bevel gears 36 meshing with the differential gears 35. The gear segment 9 is suitably secured to this differential gear case 34, as by a pin 37.

The gear case 34 is rotatably supported on the ends of the shafts 7a, 7b by suitable bearings (not shown). The shafts in turn are journalled in suitable bearings, for example needle bearings 38, mounted in the support ring 2a. In FIG. 4 the pair of drive members 20 and 20a operate effectively as a unit, so that upon positively driven movement of the drive ring 24 and a slight braking of the support ring 2a, a moment is exerted upon the sector gears 9 and the gear cage 34 which is uniformly transmitted via the ends of the shafts 7a and 7b to the lever arms 10, thereby obtaining at both ends of each ironing jaws the same engaging pressure against a chucked coil arm.

In order to maintain the engaging pressure of the ironing jaws during the entire operating time of the machine at a desired magnitude, the support ring 2a is, in accordance with the invention, subjected to braking action by an adjustable brake. This brake may be of any type, however, it is advantageous to apply the braking action not directly to the support ring proper, but to couple it with the support ring by intermediate members in order to permit the geneated friction heat to be dissipated in a better manner. In the embodiment according to FIG. 1, for example, gears 28 and 29 are provided for this purpose meshing with the teeth 2b of the support ring 2a, and being arranged in a common plane side by side. On the other hand these two gears are in continuous meshing engagement with a common gear 30 provided with the schematically illustrated brake assembly 31. The arrangement of the pair of gears 28 and 29 assures a continuous meshing with teeth 2b of the support ring 2a notwithstanding the interruption caused by the slot 6.

The brake assembly 31 connected with the gear 30, or its shaft respectively may be any type of adjustable brake, such as a mechanical brake, an electromagnetic brake, or an electric induction brake, which latter may readily be adjusted with regard to its braking force by a potentiometer.

However, there still remains the disadvantage that the specific surface pressure of the ironing jaws with regard to the coil arms increases at those locations where the ironing jaws do not contact the coil arm with their entire surface as, for example, is the case at the corners of the coil, especially at the small sides of the coil.

In order to overcome this drawback, a control element may be moved synchronously with the rotation of the ironing jaws, to act upon the adjustable brake 31, so as to reduce the brake action in the desired positions of the ironing jaws relative to the coil arm 5. Thus, high pressure per unit of area at the corners of the coil arm and at its narrow sides which are not engaged by the entire surface of the ironing jaws is prevented.

To cause a control member to follow the movement of the ironing jaws 3 and 4 it is necessary, to transfer the movement, or the rotation respectively, of the support ring 2a carrying the ironing jaws to the control member in such a manner that it will move, for example rotate, synchronously with the rotation of the ironing jaws. The position of the ironing jaws at the coil arm will then always be indicated exactly by the control member, so that it may be provided with control cams, or the like, in the position in which the ironing jaws are not contacting the coil arm with their total surface. These control cams, or the like, of the control member always contact a stationary switch, a sensing element, or the like, exactly at that moment when the ironing jaws are positioned at the coil corners, or the defined locations respectively.

The transfer of the rotating movement of the support ring 2a may be achieved directly by a gear 40 (FIG. 5) meshing with gears 26b carried by the drive gears 26, since the drive ring 24 rotates substantially synchronously with the support ring 2a. It is merely necessary to provide a suitable gear reduction so that the gear 40 rotates with the same speed as the support ring 2a.

The above mentioned control member may be connected directly to the gear 40, or its shaft respectively. This control member may advantageously be connected as a mechanically acting member which also controls a mechanically operated brake. But evidently any other transfer means may be used for the control movement.

However, since with regard to the adjustability, as well as constant brake action etc. an electromagnetic or an induction brake is best suited, an electric switching arrangement is used according to the invention controlling the exciting voltage of this brake.

A disc 41, a roller, or the like serving as control member is connected to the gear 40. This disc 41 is provided with the mentioned control cams, or in the case of the embodiment shown as an example, with recesses 42. The disc either influences mechanically, or in an inductive, or optical manner a switch 43, for example a slot actuated switch. By means of this switch 43 the voltage of a curcurent source 45 is controlled through relay means 44 which is to be fed to the induction brake 31.

For adjusting the desired brake action the exciting voltage is set by a control member. In order to reduce the exciting voltage to a predetermined value a second adjustable control member may be provided which is switched on instead of the first control member by a suitable relay, or the like, as indicated at 44, whenever one of the slots or recesses 42 passes the switch 43. Thereby it is possible to separately adjust desired brake actions for those portions of the coil arm in which the ironing jaws are contacting the arm with their total surface, or for those portions in which they contact the arm with merely part of their surface.

The slots 42 in the disc 41 are, of course, arranged in such a manner that their width and spacings correspond to the configuration of the coil arm 5.

According to the invention it is possible to maintain an exactly uniform surface pressure during the entire rotation of the ironing jaws and not only reduce the contacting pressure of the ironing jaws at defined locations. This may be achieved by means of a control member formed in accordance with a mathematical function computed exactly in correspondence with the configuration of the coil arm.

When considering a complete rotation of 360° of the ironing jaws, the surface pressure per unit area proceeds from a defined value at the broad side of the coil arm towards the corner in a steep manner, then towards a narrow side somewhat decreasingly etc., approximately according to a cycloid. Therefore, the control member should operate according to such curve and should control the exciting voltage of the brake exactly inversely.

The control member, or the disc 41 respectively, may of course be exchanged. It may also be adjustable and adaptable to different coil dimensions.

What we claim is:
1. A rotary machine for ironing insulating material around the rectangularly shaped straight arm portions of coils for electric machines comprising centrally located chucking means stationarily maintaining said coil arm substantially aligned with the axis of rotation of said machine; a transversely slotted annular support member substantially coaxially encompassing said coil arm and pivotally supporting a pair of double armed levers on diametrically opposed pivot shafts extending in parallel relation to the axis of rotation; each of said double armed levers having at least one arm extending toward said axis of rotation; a pair of heated ironing jaws carried by the free ends of said inwardly extending lever arms for pivotal movement around axes extending in parallel relation to said axis of rotation, said ironing jaws engaging said coil arm with said insulating material disposed therebetween in opposed relation; a pair of axially spaced intermediate drive members each being provided with an inner toothed section disposed diametrically with respect to each other and each being in mesh with a sector gear formed on the other outwardly extending arms of said pair of double armed levers, said meshing engagement allowing said pair of double armed levers to pivot around their pivotal axes thereby causing a relative rotational movement between said annular support means and said pair of intermediate drive members; a transversely slotted main drive ring coaxially encompassing said intermediate pair of drive members and drivingly coupled with said pair of intermediate drive members by differential gear means allow- ing relative rotational movement of said intermediate drive members with respect to each other thereby compensating for asymmetrical movements of said pair of double armed levers caused by misaligned or asymmetrically shaped coil arms; and drive means for rotating said main drive ring.

2. A machine according to claim 1, wherein said differential gear means comprises bevel gears rotatably supported by said main drive ring and simultaneously engaging cooperating bevel gear teeth formed in confronting side walls of said axially spaced intermediate drive members.

3. A machine according to claim 1, wherein the outwardly extending arms of said pair of double armed levers provided with said sector gears are rigidly connected to the inwardly extending arms carrying said ironing jaws.

4. A machine according to claim 1, wherein each of said pair of double armed levers includes two inwardly extending lever arms carrying said ironing jaws, said pivot shafts carrying said double armed levers each comprising two separate axially aligned portions disposed at opposite sides of said annular support member, said sector gears each engaging an inner toothed section of said intermediate drive means, said intermediate drive means being formed by a pair of transversely slotted rings and each sector gear being connected simultaneously to the two aligned portions of one of said pivot shafts by further differential gear means.

5. A machine according to claim 4, wherein bevel gears are mounted on the confronting ends of the aligned portions of said pivot shafts, said bevel gears meshing with further bevel gears rotatably supported in a cage member, said cage member being rotatably supported on said aligned portions of said shafts and rigidly connected to the particular lever arm provided with said sector gear.

6. A machine according to claim 1, further comprising adjustable brake means acting to restrain rotation of said annular support means thereby determining the contract pressure between said ironing jaws and said coil arm.

7. A machine according to claim 6, wherein said brake means are formed by an adjustable electric induction brake.

8. A machine according to claim 1, wherein said transversely slotted annular support means is a spur gear meshing with two circumferentially spaced pinions, so as to drivingly bridge said slot, said pinions meshing with a common gear cooperating with adjustable brake means.

9. A machine according to claim 8, wherein a control member is provided synchronously rotating with said ironing jaws and acting upon said adjustable brake to reduce the brake action in a desired position of said ironing jaws relative to said coil arm.

10. A machine according to claim 9, wherein said brake is of the electrically operated type, and wherein said control member synchronously rotating with said ironing jaws actuates electrical switch means causing a reduction in the exciting voltage of the brake when the surfaces of the ironing jaws are merely partly engaging said coil arm.

11. A machine according to claim 9, wherein the brake action of said adjustable brake is controlled by said control member during the rotation of said ironing jaws in accordance with a mathematical function to which said control member may be set.

12. A machine according to claim 11, wherein said control member is formed by a disc for actuating electric switch means.

13. A machine according to claim 12, wherein said electric switch means is a slot initiator.

14. A machine according to claim 10, wherein the exciting voltage of said electrically operated switch is adjustable by two independent control means which may selectively be short circuited by said switch means.

15. A machine according to claim 1, wherein said chucking means for said coil arm comprises two stationary axially spaced abutment angles, both of said abutment angles being precisely aligned in parallel relation to the longitudinal axes of said ironing jaws.

No references cited.

RICHARD H. EANES, JR., *Primary Examiner.*